(12) United States Patent
Kimbrell et al.

(10) Patent No.: US 8,831,394 B2
(45) Date of Patent: Sep. 9, 2014

(54) FIBER MANAGEMENT SPOOL

(75) Inventors: Eddie Kimbrell, Dacula, GA (US); Wilfred Courchaine, Moore, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 577 days.

(21) Appl. No.: 13/056,052

(22) PCT Filed: Sep. 14, 2010

(86) PCT No.: PCT/US2010/048690
§ 371 (c)(1),
(2), (4) Date: Jan. 26, 2011

(87) PCT Pub. No.: WO2011/032118
PCT Pub. Date: Mar. 17, 2011

(65) Prior Publication Data
US 2012/0039577 A1 Feb. 16, 2012

Related U.S. Application Data

(60) Provisional application No. 61/242,001, filed on Sep. 14, 2009.

(51) Int. Cl.
*G02B 6/00* (2006.01)
*B65H 75/14* (2006.01)
*G02B 6/44* (2006.01)
*B65H 75/44* (2006.01)
*B65H 75/36* (2006.01)

(52) U.S. Cl.
CPC ........ *G02B 6/4466* (2013.01); *B65H 2701/534* (2013.01); *B65H 75/143* (2013.01); *B65H 75/446* (2013.01); *B65H 75/36* (2013.01); *B65H 2701/32* (2013.01)
USPC ............................ 385/135; 385/134; 385/137

(58) Field of Classification Search
USPC ......................................................... 385/135
See application file for complete search history.

(56) References Cited

U.S. PATENT DOCUMENTS

| 5,490,595 | A | | 2/1996 | Sakai et al. |
| 5,559,922 | A | | 9/1996 | Arnett |
| 6,157,350 | A | * | 12/2000 | House et al. .................. 343/906 |
| 6,243,526 | B1 | | 6/2001 | Garibay et al. |
| 6,398,149 | B1 | * | 6/2002 | Hines et al. .................... 242/399 |
| 6,814,328 | B1 | * | 11/2004 | Li et al. ....................... 242/400.1 |
| 7,059,895 | B2 | * | 6/2006 | Murano ......................... 439/501 |
| 7,359,611 | B1 | * | 4/2008 | Kaplan .......................... 385/135 |
| 2006/0171651 | A1 | | 8/2006 | Laursen |
| 2008/0050085 | A1 | | 2/2008 | Tinucci |

* cited by examiner

*Primary Examiner* — Uyen Chau N Le
*Assistant Examiner* — Kajli Prince
(74) *Attorney, Agent, or Firm* — Sughrue Mion, PLLC

(57) ABSTRACT

Provided is a fiber management spool, the spool including a barrel extending up from a bottom portion. The spool further includes at least one outer fiber retaining arm extending up from an annular portion of the bottom portion and the annular portion extends radially away from an outer circumferential surface of the barrel. The at least one snap finger extends downward from a central portion of the bottom portion, wherein the snap finger is configured to engage a panel to releasably secure the spool to the panel.

16 Claims, 6 Drawing Sheets

FIBER MANAGEMENT SPOOL

CROSS-REFERENCE TO RELATED APPLICATIONS

This application claims the benefit of U.S. Provisional Patent Application No. 61/242,001 filed on Sep. 14, 2009 in the U.S. Patent and Trademark Office, the disclosure of which is incorporated herein in its entirety by reference.

BACKGROUND OF THE INVENTION

1. Field of the Invention

Methods and apparatuses consistent with aspects of the present invention relate to a fiber management system including a spool for holding fiber optic cables and a panel for securing the spool.

2. Background of the Invention

Panels, shelves, and enclosures commonly use spools to store and control the bend radius of optical fibers and optical fiber cables to prevent attenuation due to excessive bending. In the related art, spools are attached using screws, PEM studs, etc. To be connected in this fashion requires additional hardware which adds to the cost and usage limitations of existing panels, shelves, etc. Thus, there is a need for a spool apparatus that does not require additional hardware to be secured to a panel.

SUMMARY OF TIM INVENTION

An aspect of the invention is to provide a fiber management system including a fiber management spool and a panel for securing the same.

In accordance with an aspect of the present invention, a fiber management spool is provided and includes a barrel extending up from a bottom portion and a plurality of fiber retaining arms extending up from an annular portion of the bottom portion, the annular portion extending radially away from an outer circumferential surface of the barrel. The spool also includes a plurality of snap fingers extending downward from a central portion of the bottom portion that are configured to engage a panel to releasably secure the spool to the panel. The spool may also include a plurality of barrel arms extending radially from the top of the barrel.

The fiber management spool may also include an extension member that extends upward from each of the snap fingers; the extension member is configured as a lever that moves an engaging part of the snap finger. A plurality of tab members may be disposed on a top portion of the barrel and axe configured to releasably couple with a second fiber management spool to enable the stacking of multiple spools. A plurality of openings may also be formed in the bottom portion of the spool and configured to receive a tab member from another spool.

According to another aspect, the spool may also include an alignment member configured to engage with a second fiber management spool when the second fiber management spool is coupled to the spool.

According to another aspect, a fiber management system is provided. The system includes a panel configured to receive a spool. The spool includes a barrel extending up from a bottom portion and a plurality of fiber retaining arms extending up from an annular portion of the bottom portion, the annular portion extending radially away from an outer circumferential surface of the barrel. The spool also includes a plurality of snap fingers extending downward from a central portion of the bottom portion that are configured to engage a panel to releasably secure the spool to the panel. The spoor may also include a plurality of barrel arms extending radially from the top of the barrel.

According to another aspect, the system may also include an extension member that extends upward from each of the snap fingers, the extension member is configured as a lever that moves an engaging part of the snap finger to release the snap finger from engagement with the panel. The spool may include a plurality of tab members disposed on a top portion of the cylindrical barrel that are configured to releasably couple with a second fiber management spool disposed on a side of the spool that is distant from the panel.

According to another aspect, the spool includes a recessed portion in bottom portion that corresponds to a raised portion in the panel.

According to another aspect, a method is provided wherein the spool is attached to a panel using the snap fingers and an optical fiber is wrapped around the barrel of the spool. The optical fiber may be wrapped around the spool either before or after the spool is attached to the panel.

BRIEF DESCRIPTION OF THE DRAWINGS

The above and/or other aspects of the invention will become apparent and more readily appreciated from the following description of the exemplary embodiments, taken in conjunction with the accompanying drawings in which.

DETAILED DESCRIPTION OF THE EXEMPLARY EMBODIMENTS

Hereinafter the non-limiting exemplary embodiments of the present invention will be described in detail with reference to the accompanying drawings.

Figure 1:
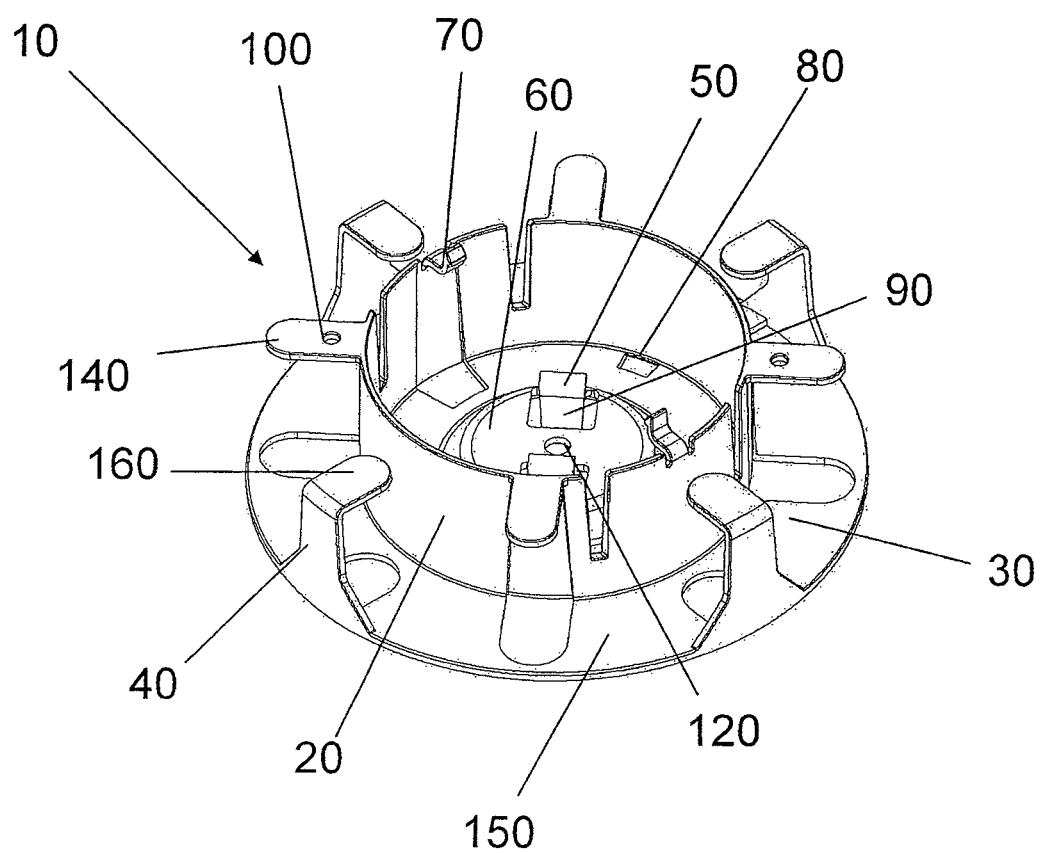
FIG. 1 is a perspective view showing a spool according to a first exemplary embodiment.
Figure 2:
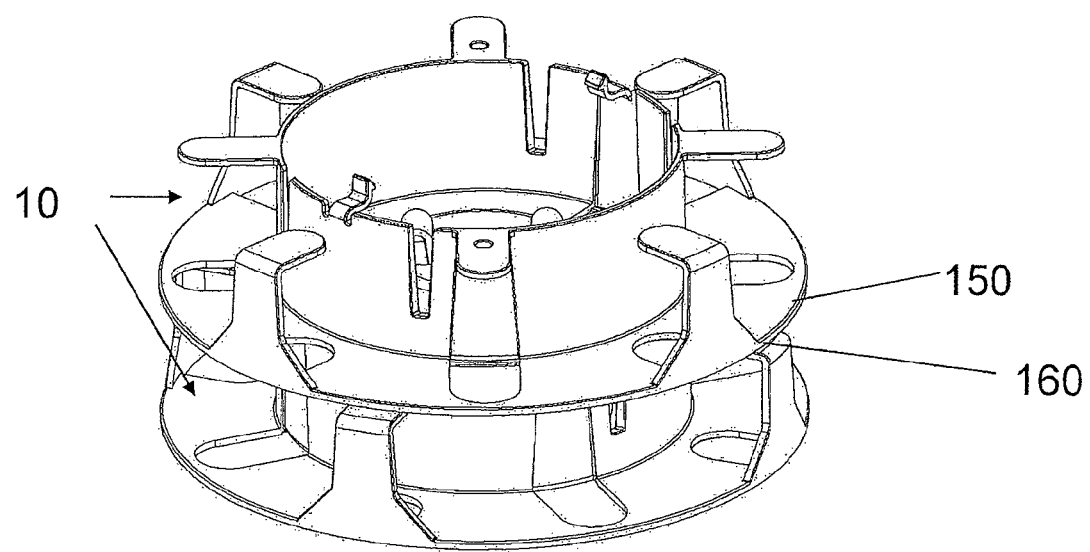
FIG. 2 is a perspective view showing stacked spools.
Figure 3:
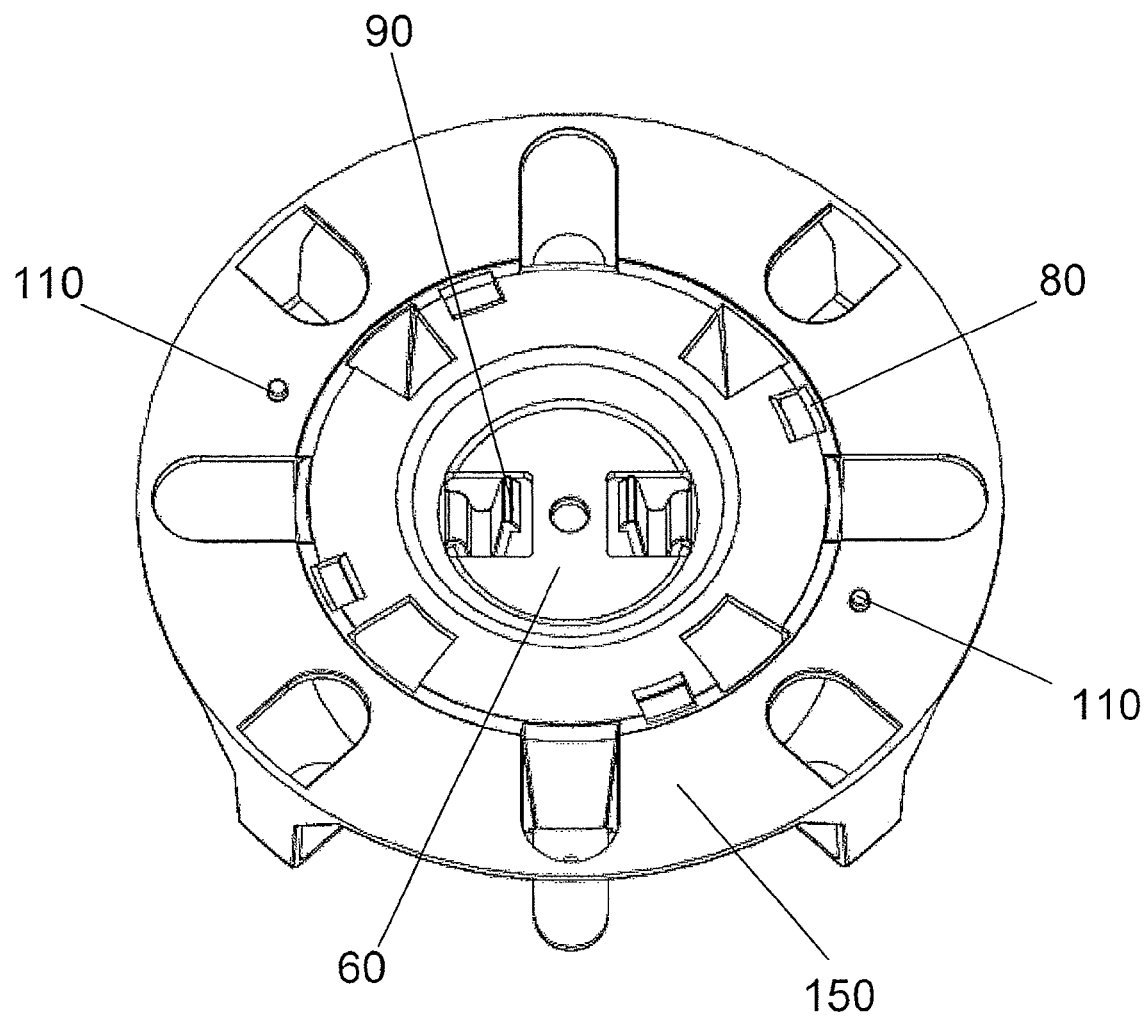
FIG. 3 is a perspective view showing the bottom of the spool according to the first exemplary embodiment.

The first exemplary embodiment is shown in FIGS. 1-3. FIG. 1 shows a spool 10 configured to hold and retain fiber optic cables. The spool 10 includes various components for holding a fiber optic cable. Specifically, the spool 10 includes a cylindrical shaped barrel 20 extending away from a bottom portion 30. Inner fiber retaining arms 140 extend radially outward from the top of the barrel 20. The spool 10 also includes an annular portion 150 that is provided around the periphery of the bottom of the barrel 20. A plurality of outer fiber retaining arms 40 extend upward from an outer peripheral portion of the annular portion 150. These outer fiber retaining arms 40 include inward extensions 160 that are provided at a top of each outer fiber retaining arm 40. The inward extensions 160 extend inward toward the barrel 20. Further, as shown in FIG. 1, to facilitate the installation or removal of fiber optic cables from the spool 10, the inner fiber retaining arms 140 and the outer fiber retaining arms 40 are alternately disposed around the circumference of the spool 10. The barrel 20, the inner retaining arms 140 and the outer retaining arms 40 define the optical fiber storage area of the spool 10.

Figure 5:
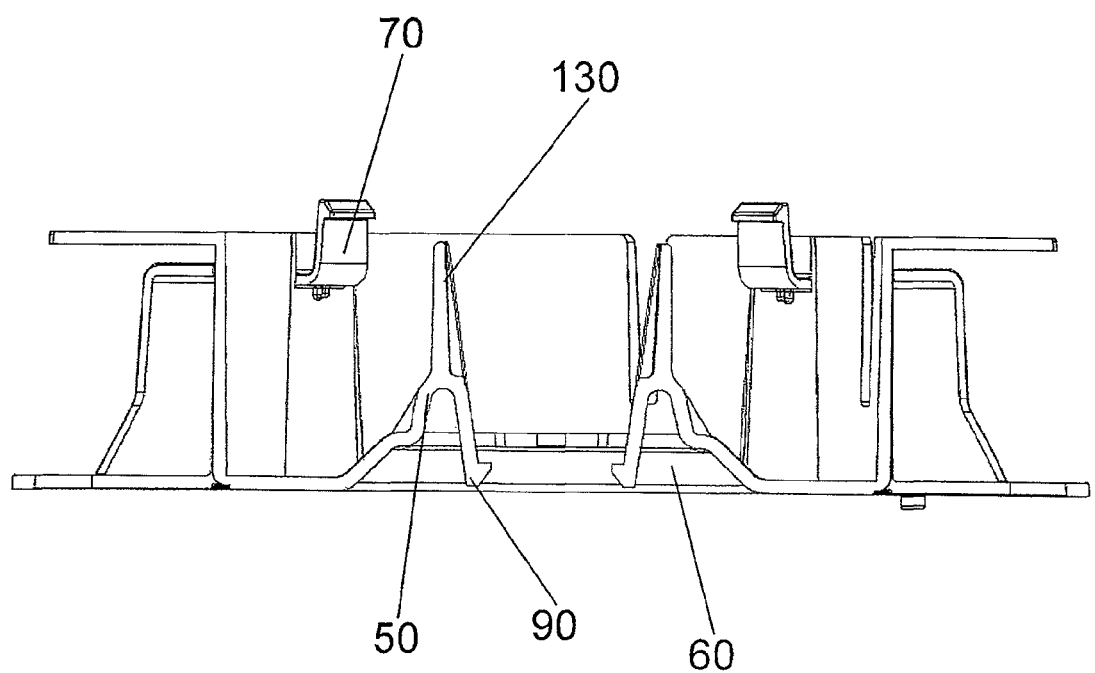
FIG. 5 is a cross-sectional view showing a spool according to the second embodiment.

The spool 10 also includes snap fingers 50 that are configured to releasably attach the spool 10 to a panel 180. The spool 10 may also include a center hole 120 for securing the spool 10 to a panel 180 using a screw, bolt, etc. As shown in FIGS. 1, 3 and 5, the snap fingers 50 have a U-shape so that the snap fingers may flex when inserted into a receiving hole, such as snap finger receiving portions 160 shown in FIG. 6. An engaging part 90 of the snap finger 50 is configured to releasably secure the spool 10 to a panel 180. Panel as used herein includes, but is not limited to a flat panel. A panel refers to any structure upon which the spool 10 may be mounted, e.g., a shelf, wall, curved surface, etc.

Additionally, to facilitate the alignment and attachment to a panel 180, the spool 10 may also include a recessed portion 60 that is configured to mate with a raised portion 170 on a panel 180. Further, the spool 10 may also include pins 110 disposed on the lower side of the bottom portion 30. These pins 30 are configured to engage with corresponding alignment holes 100 on a panel 180.

As shown in FIG. 2, the spool 10 may be configured so as to releasably engage another spool 10 to form a spool stack. To enable this stacking, the spool 10 includes tabs 70 disposed on an upper portion that are configured to engage tab receiving portions 80 (openings) disposed on a lower portion of another spool 10. In the embodiment depicted in FIG. 1, the tabs 70 are disposed on an upper portion of the barrel 20 and extend upward from the bottom portion 30 and inward toward a center of the spool 10. The tab receiving portions 80 are disposed on a bottom portion 30 of the spool 10 at a position inside of the barrel 20.

Further, to aid in alignment of the stacked spool configuration, the alignment holes 100 may be included on an upper surface of the spool 10 so as to engage with pins 110 disposed on the bottom surface of another spool 10. In the embodiment of FIG. 1, these alignment holes 100 are provided on the inner fiber retaining arms 40. However, the present invention is not limited to this configuration and the alignment hole may be placed on any portion of the upper surface of the spool 10.

Also, the inner and outer fiber retaining arms 40, 140 may be set at a different height. In particular, as shown in FIG. 2, the height of the extensions 160 is set lower than the inner fiber retaining arms 140 so that the optical fiber may be placed on the lower of the stacked spools 10 after the upper spool 10 is placed on the lower spool.

Figure 4:
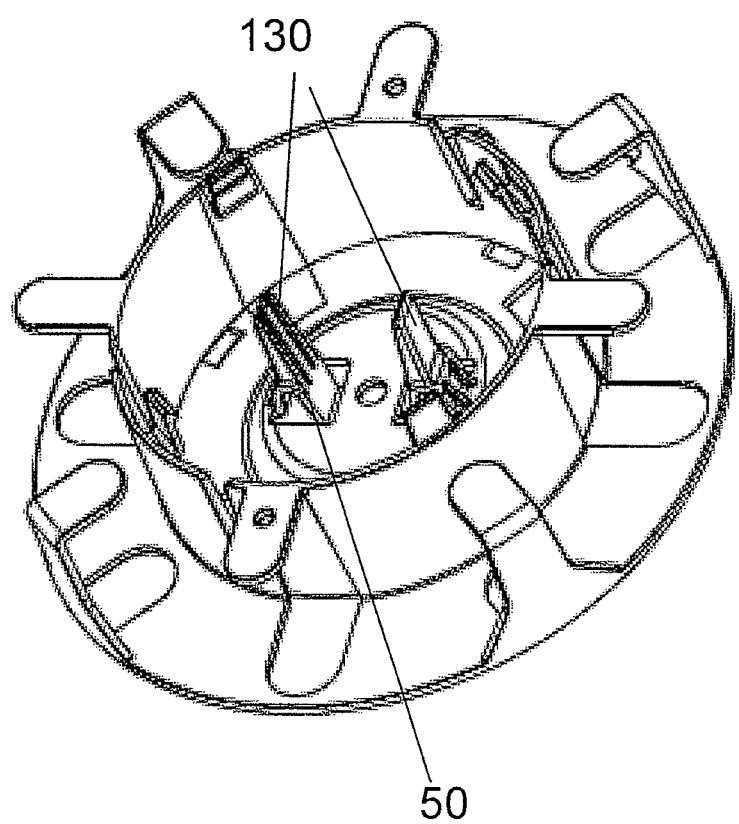
FIG. 4 is a perspective view showing a spool according to a second exemplary embodiment.

A second embodiment of the present invention is shown in FIGS. 4 and 5, and may include any of the features described above with respect to the first embodiment. In this embodiment, the snap fingers 50 of the spool 10 further include extensions 130 that extend upward from the snap fingers 50. These extensions 130 are configured to function as a lever to aid in securing and releasing the snap fingers 50 from a panel 180. In this particular configuration, the extensions 130 are provided on snap fingers 50 disposed on opposite sides of the center of the spool 10 such that they can be pressed toward one another to release or secure the spool 10 to a panel 180.

Figure 6:
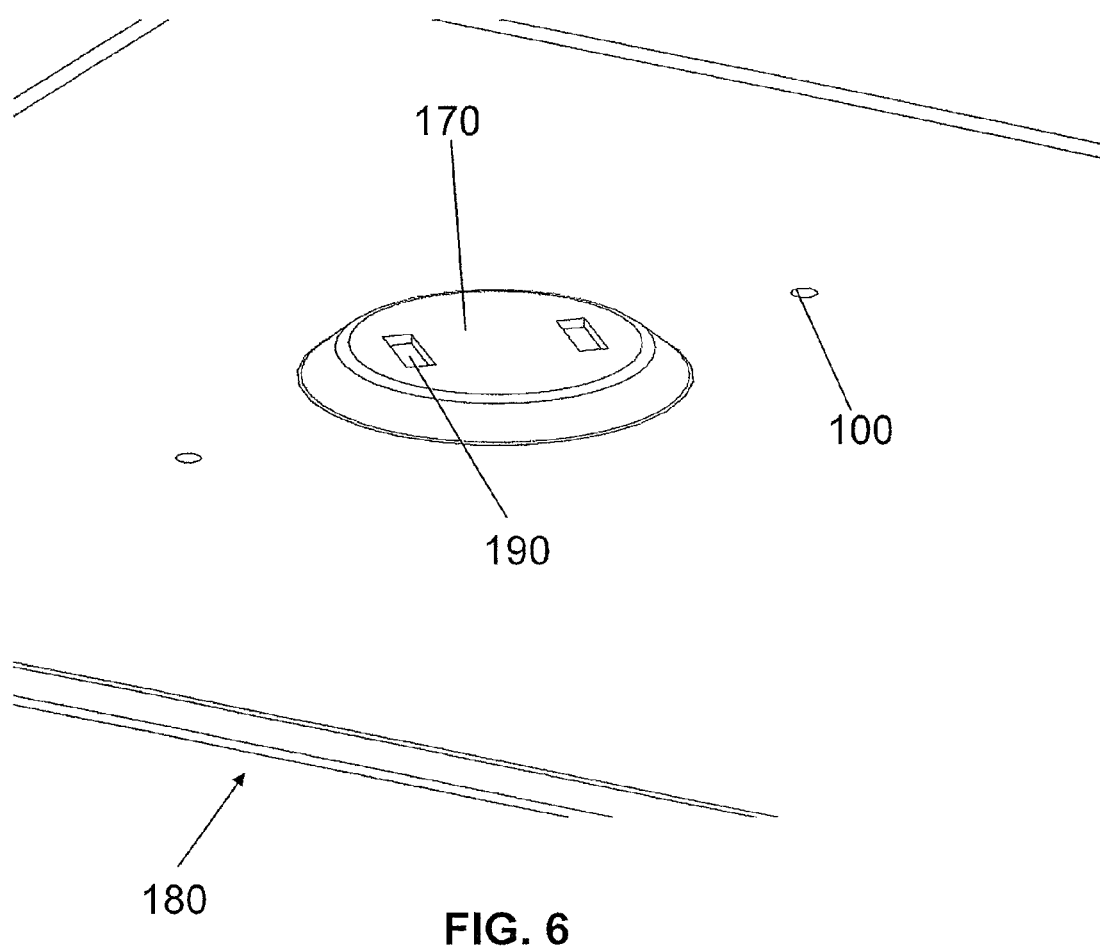
FIG. 6 is a perspective view showing a panel configured to secure a spool of either the first or second embodiments.

A fiber management system is provided by using the spool 10 of either the first or second embodiment in combination with the panel of FIG. 6. The panel 180 may be a wall mountable device or may comprise an internal component or external wall of a fiber optic cabinet.

The spool 10 may be utilized according to the following method. Spools 10 may be fitted with fiber optic cable before being attached to a panel 180. When additional fiber optic cables are required, additional spools may be added by merely attaching a spool directly to a panel 180, or by stacking an additional spool 10 onto an already attached spool 10.

Although a few exemplary embodiments of the present invention have been shown and described, it would be appreciated by those skilled in the art that changes may be made in this embodiment without departing from the principles and spirit of the invention, the scope of which is defined in the claims and their equivalents. Additionally, while the spools are described above for use with fiber optic cables, the invention is not so limited. Rather, the spools may be used with wires or any other type of flexible cable.

What is claimed is:

1. A fiber management spool, the spool comprising:
a barrel extending up from a bottom portion;
a plurality of outer fiber retaining arms extending up from an annular portion of the bottom portion, the annular portion extending radially away from an outer circumferential surface of the barrel;
a plurality of snap fingers extending downward from a central portion of the bottom portion, and
an extension member that extends upward from each of the snap fingers, the extension member is configured as a lever that moves an engaging part of the snap finger;
wherein the snap fingers are configured to flex when engaging complementary recessions in a panel to releasably secure the spool to the panel.

2. The fiber management spool according to claim 1, further comprising:
a plurality of tab members disposed on a top portion of the barrel that are configured to releasably couple with a second fiber management spool.

3. The fiber management spool according to claim 2, further comprising:
a plurality of openings in the bottom portion each configured to receive a tab member from another spool.

4. The fiber management spool according to claim 2, further comprising:
a plurality of inner retaining arms extending radially from the top of the barrel.

5. The fiber management spool according to claim 4, further comprising:
an alignment member configured to engage with the second fiber management spool when the second fiber management spool is coupled to the spool.

6. The fiber management spool according to claim 4, further comprising:
inward extensions at a top of the outer retaining arms,
wherein the inward extensions are disposed closer to the annular portion.

7. A method for managing optical fibers, the method comprising: attaching the spool of claim 1 to a panel using the snap fingers; and wrapping an optical fiber around the barrel.

8. The method according to claim 7, wherein the spool is attached the panel before the optical fiber is wrapped around the barrel.

9. The method according to claim 7, wherein the spool is attached to the panel after the optical fiber is wrapped around the barrel.

10. A fiber management system, the system comprising:
a panel;
a spool that comprises:
a barrel extending up from a bottom portion;
a plurality of outer fiber retaining arms extending up from an annular portion of the bottom portion, the annular portion extending radially away from an outer circumferential surface of the barrel;
a plurality of snap fingers extending downward from a central portion of the bottom portion, and an extension member that extends upward from each of the snap fingers, the extension member is configured as a lever that moves an engaging part of the snap finger;

wherein the snap fingers are configured to flex when engaging complementary recessions in a panel to releasably secure the spool to the panel.

11. The fiber management system according to claim 10, further comprising:

a plurality of tab members disposed on a top portion of the barrel that are configured to releasably couple with a second fiber management spool disposed on a side of the spool that is distant from the panel.

12. The fiber management system according to claim 11, further comprising:

a plurality of openings in the bottom portion each configured to receive a tab member from another spool.

13. The fiber management system according to claim 11, further comprising:

a plurality of barrel arms extending radially from the top of the barrel.

14. The fiber management system according to claim 13, further comprising:

an alignment member configured to engage with the second fiber management spool when the second fiber management spool is coupled to the spool.

15. The fiber management system according to claim 13, wherein the spool includes a recessed portion in bottom portion that corresponds to a raised portion in the panel.

16. A fiber management spool, the spool comprising:

a barrel extending up from a bottom portion;

at least one outer fiber retaining arm extending up from an annular portion of the bottom portion, the annular portion extending radially away from an outer circumferential surface of the barrel;

at least one snap finger extending downward from a central portion of the bottom portion, and an extension member that extends upward from each of the snap fingers, the extension member is configured as a lever that moves an engaging part of the snap finger;

wherein the snap finger is configured to flex when engaging a complementary recession in a panel to releasably secure the spool to the panel.

* * * * *